United States Patent [19]

Henderson et al.

[11] 4,002,771

[45] Jan. 11, 1977

[54] PROCESS FOR PREPARING A DRY, FLOWABLE SUGAR/FAT COMPONENT AND WHIPPABLE DESSERT COMPOSITION

[75] Inventors: Gary Arthur Henderson, Cobourg; Clifford Arthur Allen Dunlop, Richmond, both of Canada

[73] Assignee: General Foods, Limited, Toronto, Canada

[22] Filed: Feb. 6, 1974

[21] Appl. No.: 440,109

[52] U.S. Cl. .............................. 426/103; 426/574; 426/613
[51] Int. Cl.² ...................... A23L 1/04; A23G 3/00
[58] Field of Search ............ 426/162, 163, 103, 99, 426/201, 213, 574, 6, 613, 307, 578

[56] References Cited

UNITED STATES PATENTS

| | | | |
|---|---|---|---|
| 2,547,206 | 4/1951 | Hanau | 426/307 |
| 2,598,282 | 5/1952 | Melnick | 426/163 |
| 2,712,503 | 7/1955 | Dyekjaer | 426/307 |
| 2,992,113 | 7/1961 | Gorman et al. | 426/163 |
| 3,231,391 | 1/1966 | Brewik et al. | 426/163 |
| 3,579,355 | 5/1971 | Wyss | 426/163 |
| 3,702,254 | 11/1972 | Cassanelli et al. | 426/163 |
| 3,734,745 | 5/1973 | Cassanelli et al. | 426/163 |

*Primary Examiner*—Jeanette M. Hunter
*Attorney, Agent, or Firm*—Thomas V. Sullivan; Bruno P. Struzzi; Mitchell D. Bittman

[57] ABSTRACT

Preparing a dry flowable sugar-fat for use in a multiple self-layering whippable dessert composition by applying molten fat to cold sugar and blending. Gelatin, buffer, acid and coloring are added and the particle size subsequently reduced to produce the dessert composition.

9 Claims, No Drawings

PROCESS FOR PREPARING A DRY, FLOWABLE SUGAR/FAT COMPONENT AND WHIPPABLE DESSERT COMPOSITION

This invention relates to powdered self-layering whippable dessert compositions. More particularly, this invention relates to a process for preparing a sugar/fat component for use in such dessert compositions.

Powdered whippable dessert compositions are known and many different types of such dessert compositions have become available in recent years. A particularly unique whippable dessert composition is disclosed and claimed in Wyss et al., U.S. Pat. No. 3,579,355, issued May 18, 1971, whose teachings are incorporated herein by reference. According to the Wyss et al. patent, a powdered whippable dessert composition can be prepared by admixing gelatin, fat, emulsifier, sugar and other minor ingredients to obtain a mix which, when water is added thereto and the mixture is whipped, produces a self-layering dessert. The dessert is characterized by the different textures and different colors of the layers even though the dessert is prepared from a single package of the dessert composition.

The Wyss et al. patent indicates that the powdered whippable dessert composition comprises a "gelatin portion" and a "fat portion." With respect to the fat portion, the patent discloses that the fat, which preferably includes an emulsifier, is combined with sugar, another component of the dessert composition, in a manner such that the fat is plated on the sugar or the fat and sugar are in chip form. While such methods involving ribbon mixing, roll refining and either grinding such as, for example, by use of a Fitz mill, or depositing from a chip depositor, are eminently suitable for obtaining the fat portion, i.e., fat, emulsifier and sugar, under some conditions, the fat, emulsifier and sugar may not be uniformly mixed. In other words, the sugar particles may not each be coated optimally. The non-uniform coating of fat and emulsifier on the sugar particles may be due to a number of factors such as, for example, the type of fat, the granulation of sugar and certain operating conditions employed with the apparatus used for producing the fat plated sugar and fat/sugar chip. Moreover, when an edible coloring agent is incorporated with the sugar, color development of the fat portion is sometimes noted to occur. Accordingly, an improved method of preparing a dry, flowable sugar/fat component for use in such powdered self-layering whippable dessert compositions has been sought after.

U.S. Pat. Nos. 3,199,988, 3,210,198 and 3,266,907 relate to processes for preparing whippable compositions. Such compositions are disclosed as useful for preparing dessert toppings or icings for cakes and the like. Although these patents describe various techniques for combining a shortening with sugar, emulsifier, proteinaceous materials and other ingredients, the methods so disclosed do not appear to be satisfactory for preparing a sugar/fat component for use in a powdered self-layering whippable dessert composition. It seems that the techniques there disclosed such as (a) impact milling followed by intensive blending and grinding, (b) intensive blending and grinding followed by ribbon mixing, then shearing and crushing and (c) plasticizing followed by intensive blending and grinding, while suitable for producing a composition that is to be later whipped to yield a homogeneous product, namely, a whipped topping, are not adapted for preparing a composition which when whipped is designed to stratify into distinct separate layers, that is, to form a heterogenous product. An evenly coated sugar/fat component is essential in a self-layering whippable dessert composition to ensure rapid emulsification of the dessert ingredients and satisfactory formation of layers. If the sugar is not properly and evenly coated with fat, the resulting products may be inconsistent in their layering performance.

We have now discovered that a dry, flowable sugar/fat component for a powdered self-layering whippable dessert composition can be prepared by uniformly coating the sugar with melted fat while maintaining the temperature of the sugar below that of the melting temperature of the fat and blending the sugar/fat mixture to form the component. The component so prepared is found to have the fat more uniformly coated on the sugar and, as a result, the final powdered self-layering whippable dessert composition is characterized by a less segregated appearance and seems to be more tolerant of recipe preparation errors.

The process involves preferably cooling the sugar with a coolant such as carbon dioxide to less than about 25° F. and then applying melted fat at about 160° F. onto the cold sugar. The sugar may have added to it one or more edible coloring agents and the fat may have added to it one or more emulsifiers. The Wiley melting point range of the fat and emulsifiers is between about 99° and 114° F. During the coating operation, blending of the sugar/fat mixture is conducted for a period of time sufficient to ensure uniformity of the coating.

The advantages of the process of this invention are that it allows for more efficient coating of sugar with fat, reduces labor time and cost, eliminates storage requirements while allowing for color development during coating, makes less space demands for equipment, reduces cost of solid carbon dioxide and avoids sugar pulverization steps.

The process may be carried out employing various types of rapid and efficient liquid-solids mixing equipment. Preferably, a twin shell mixer with an intensifier bar to spray melted fat onto cold sugar thereby forming the solid sugar/fat component is used. The sugar can be cooled with solid carbon dioxide providing the twin shell mixer is fitted with appropriate filter pads and valves to release the pressure produced by the carbon dioxide. A colored sugar/fat component may be produced by adding an edible coloring agent such as, for example, a food grade dye to the sugar before spraying the fat on.

After coating, the component may be reduced to a fine powder by passing it through suitable milling or grinding apparatus such as, for example, an Entolator, Fitz Mill, etc., with appropriate cooling to avoid remelting of the fat. The component may then be mixed with the other ingredients in any standard type of mixer to form the dessert composition. Alternatively, the component and other ingredients may be mixed and the composition then is reduced to a fine powder with appropriate cooling. The process may also be used to coat all dessert ingredients with fat, thereby eliminating the second mixing step, which results in significant processing cost reductions.

In order to illustrate the present invention, the examples hereinafter given are furnished but it is to be understood that these are not limiting. Also, as previously mentioned, the disclosure of U.S. Pat. No. 3,579,355 is incorporated herein by reference and the sugars, fats, emulsifiers, colors, gelatin and other ingredients and the amounts thereof making up the powdered self-layering whippable dessert composition are described therein. However, it is apparent that other equivalent ingredients, materials and components may be employed as may also other obvious processing modifications.

A typical powdered self-layering whippable dessert composition formulation is as follows:

| Ingredients | % |
|---|---|
| Sugar (powdered) | 80.3 |
| Hydrogenated Vegetable Oil (with B.H.A.)- (Kaomel, Trade Mark) | 7.0 |
| Gelatin | 5.5 |
| Hydrogenated Vegetable Oil (Wecotop B, Trade Mark) | 2.8 |
| Adipic Acid | 1.3 |
| Diglycerol Monostearate | 0.7 |
| Guar Gum | 0.7 |
| Trisodium Citrate | 0.6 |
| Flavoring Agents | 0.5 |
| Fumaric Acid | 0.4 |
| Lecithin | 0.1 |
| Coloring Agent (certified, food grade) | 0.1 |
| | 100.0 |

EXAMPLE I

The powdered sugar and the coloring agent are added to a twin shell mixer. Simultaneously, a sufficient quantity of shaved solid carbon dioxide is added and mixed in, causing the temperature to drop to less than 25° F. After all of the carbon dioxide gas has evolved, the mixer is started and the coloring agent is mixed in for approximately three minutes, then melted fat (hydrogenated vegetable oils) containing previously melted and blended emulsifiers (diglycerol monostearate and lecithin) are sprayed in through the intensifier bar for approximately 3 minutes. After a further two minutes of mixing the free flowing sugar/fat component is transferred to an Entolator where it is further reduced to a fine powder while maintaining the temperature of the component at less than about 45° F. by adding solid carbon dioxide. The component is then mixed with the remaining other ingredients (gelatin, adipic acid, fumaric acid, quar gum, trisodium citrate, and flavoring agents) in a ribbon mixer to produce the finished powdered self-layering whippable dessert composition.

EXAMPLE II

The process of Example I is repeated in all essential respects except that, after the fat and emulsifiers have been added, the remaining other ingredients are added, mixed in, and then the complete mix is later reduced to a fine powder to form the finished powdered self-layering whippable dessert composition.

EXAMPLE III

The process of Example I is repeated in all essential respects except that all of the ingredients are added at first, mixed in, and then coated with the fat and emulsifier mixture. The complete mix is subsequently reduced to a fine powder to form the final powdered self-layering whippable dessert composition.

EXAMPLE IV

The process of Example I is repeated in all essential respects except that the component is mixed with the remaining other ingredients without its having been further reduced to a fine powder.

The dessert compositions obtained as in the four examples above are noted to have a uniform dry product appearance and produce layered desserts by mixing with hot water, whipping, adding either hot or cold water, blending again and chilling, which are judged satisfactory by a test panel.

Although the process of the present invention has been described in conjunction with the preparation of a dry flowable sugar/fat component for use in a powdered self-layering whippable dessert composition of the type disclosed and claimed in U.S. Pat. No. 3,579,355, it is apparent that the component may be utilized in other similar dessert compositions such as, for example, those disclosed in U.S. Pat. No. 3,702,254, issued Nov. 7, 1972, and U.S. Pat. No. 3,734,745, issued May 22, 1973, as well as in other whippable dessert compositions generally.

The embodiments of the invention in which an exclusive property or privilege is claimed are defined as follows:

1. A process for preparing a dry, flowable sugar/fat component comprising coating said sugar by applying said fat in a melted state onto said sugar whose temperature is maintained at a temperature less than about 25° F while applying the fat onto said sugar and blending the sugar/fat mixture.

2. A process as in claim 1 further comprising incorporating an emulsifier in said fat prior to applying said fat onto said sugar.

3. A process as in claim 2 further comprising adding an edible coloring agent to said sugar prior to applying said fat onto said sugar.

4. A process as in claim 2 further comprising subsequently reducing the particle size of the resultant dry, flowable sugar/fat component.

5. A process for preparing a powdered self-layering whippable dessert composition comprising blending said sugar/fat component prepared by the process of claim 2 with gelatin, acid, buffer and an edible coloring agent.

6. A process as in claim 5 further comprising reducing the particle size of the composition.

7. The process of claim 2 wherein the melting temperature of said fat and said emulsifier is the Wiley melting point range between about 99° and 114° F.

8. The process of claim 1 wherein said fat is applied by spraying.

9. A process for preparing a powdered self-layering whippable dessert composition comprising coating sugar by applying fat and emulsifier in a melted state onto said sugar whose temperature is maintained at a temperature less than about 25° F while applying the fat onto said sugar and blending the sugar/fat and emulsifier mixture with gelatin, acid, buffer and an edible coloring agent and subsequently reducing the particle size of the composition.

* * * * *